United States Patent
Schäfer et al.

(10) Patent No.: US 12,228,391 B2
(45) Date of Patent: Feb. 18, 2025

(54) DEVICE AND METHOD FOR MEASURING A FILTER CAKE THICKNESS

(71) Applicant: BHS-Sonthofen GmbH, Sonthofen (DE)

(72) Inventors: Martin Schäfer, Sonthofen (DE); Detlef Steidl, Sonthofen (DE); Wolfgang Süss, Sonthofen (DE)

(73) Assignee: BHS-Sonthofen GmbH, Sonthofen (DE)

( * ) Notice: Subject to any disclaimer, the term of this patent is extended or adjusted under 35 U.S.C. 154(b) by 878 days.

(21) Appl. No.: 17/045,720

(22) PCT Filed: Apr. 2, 2019

(86) PCT No.: PCT/EP2019/058285
§ 371 (c)(1),
(2) Date: Oct. 6, 2020

(87) PCT Pub. No.: WO2019/193002
PCT Pub. Date: Oct. 10, 2019

(65) Prior Publication Data
US 2021/0156672 A1    May 27, 2021

(30) Foreign Application Priority Data
Apr. 6, 2018    (DE) .................... 10 2018 205 236.0

(51) Int. Cl.
*G01B 11/06* (2006.01)
*B01D 33/06* (2006.01)
(Continued)

(52) U.S. Cl.
CPC .......... *G01B 11/0691* (2013.01); *B01D 33/06* (2013.01); *B01D 33/804* (2013.01);
(Continued)

(58) Field of Classification Search
CPC ........ B01D 33/06; B01D 46/68; B01D 46/69; G01B 11/0616; G01B 11/06–11/0691
See application file for complete search history.

(56) References Cited

U.S. PATENT DOCUMENTS 1,774,044 A * 8/1930 Sweetland ............. B01D 33/72
                                                      210/780
2,050,007 A * 8/1936 Forrest .................. B01D 37/00
                                                      210/396

(Continued)

FOREIGN PATENT DOCUMENTS

CN      201807233 U    4/2011
DE      4437062 A1     5/1995
(Continued)

OTHER PUBLICATIONS

"Non-Ferrous Metal Smelting Equipment", Wet Smelting Equipment, Metallurgical Industry Press, vol. 2, Dec. 1993, No English translation available, 7 pages.

(Continued)

*Primary Examiner* — Michael P LaPage
(74) *Attorney, Agent, or Firm* — Kilpatrick Townsend & Stockton LLP

(57) ABSTRACT

A rotary pressure filter, comprising a filter drum and a housing. A sensor is attached to the housing and emits light through a light-permeable section of the housing in the direction of a filter cake. The sensor receives light reflected from the filter cake through the light-permeable section of the housing. A processing unit compares properties of the emitted light with those of the received light and determines an absolute thickness of the filter cake and/or a change in the thickness of the filter cake over a pre-determined time. The invention further relates to a corresponding method.

19 Claims, 1 Drawing Sheet

(51) Int. Cl.
  *B01D 33/80* (2006.01)
  *B01D 35/143* (2006.01)
  *B01D 35/30* (2006.01)
  *B01D 37/04* (2006.01)
  *B01D 33/067* (2006.01)

(52) U.S. Cl.
  CPC ......... *B01D 35/143* (2013.01); *B01D 35/308* (2013.01); *B01D 37/04* (2013.01); *B01D 33/067* (2013.01); *B01D 2201/309* (2013.01)

(56) References Cited

U.S. PATENT DOCUMENTS

| | | | | |
|---|---|---|---|---|
| 2,131,303 | A * | 9/1938 | Selund | B01D 33/804 |
| | | | | 210/768 |
| 3,869,211 | A * | 3/1975 | Watanabe | G01B 11/0683 |
| | | | | 356/504 |
| 4,207,835 | A * | 6/1980 | Schwiecker | C23C 14/547 |
| | | | | 118/712 |
| 5,534,139 | A | 7/1996 | Cadek et al. | |
| 9,486,721 | B2 | 11/2016 | Peuker | |
| 2004/0032591 | A1 * | 2/2004 | Itoh | G01B 11/0625 |
| | | | | 356/503 |
| 2007/0145307 | A1 | 6/2007 | Duck et al. | |
| 2012/0273432 | A1 | 11/2012 | Peuker | |
| 2013/0068673 | A1 * | 3/2013 | Maggiore | B01D 65/102 |
| | | | | 210/85 |
| 2014/0091043 | A1 * | 4/2014 | DeWaard | B01D 33/044 |
| | | | | 210/744 |
| 2018/0119359 | A1 * | 5/2018 | Gorden | D21H 21/146 |
| 2019/0046997 | A1 * | 2/2019 | Nielsen | B04B 11/043 |
| 2019/0054400 | A1 * | 2/2019 | Born | B01D 33/466 |
| 2019/0235011 | A1 * | 8/2019 | Pinney | G01W 1/00 |

FOREIGN PATENT DOCUMENTS

| | | | | |
|---|---|---|---|---|
| DE | 4425187 | A1 * | 1/1996 | ......... G01B 11/0616 |
| EP | 2520348 | A1 | 11/2012 | |
| JP | 2001038344 | A | 2/2001 | |
| WO | WO-9402806 | A1 * | 2/1994 | ............. B05C 11/02 |
| WO | WO-9915255 | A1 * | 4/1999 | ............. B01D 33/09 |
| WO | 2015092151 | A1 | 1/2015 | |
| WO | 2015092152 | A1 | 6/2015 | |

OTHER PUBLICATIONS

Chinese Application No. CN201980024360.6 , "Office Action", Aug. 2, 2022, No English translation available, 8 pages.
Chinese Application No. 201980024360.6, Chinese Office Action mailed Oct. 22, 2021, No English translation available, 9 pages.
German Application No. DE102018205236.0, "Office Action", Oct. 24, 2018, 8 pages.
International Application No. PCT/EP2019/058285, "International Search Report", Jul. 16, 2019, 7 pages.

* cited by examiner

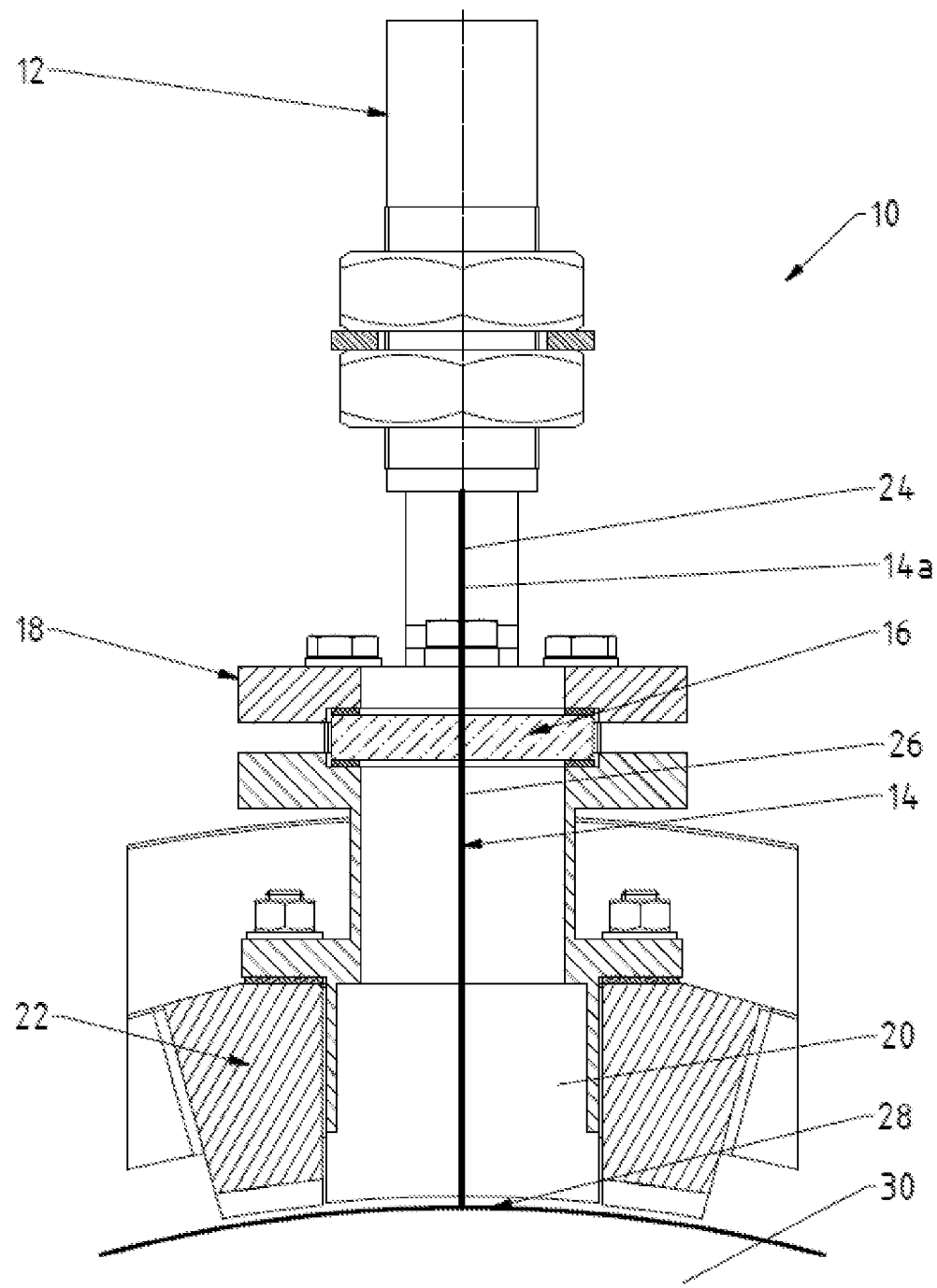

DEVICE AND METHOD FOR MEASURING A FILTER CAKE THICKNESS

CROSS REFERENCE TO RELATED APPLICATION

This application claims priority to International Patent Application No. PCT/EP2019/058285, filed on Apr. 2, 2019, which claims priority to German Patent Application No. 10 2018 205 236.0, filed in Germany on Apr. 6, 2018. The entire contents of both applications are hereby incorporated herein by this reference.

The present invention relates to a rotary pressure filter comprising a filter drum on which material to be filtered is filtered, wherein a filter cake is formed on a surface of the filter drum, and a housing that surrounds the filter drum and in which the filter drum is rotatably mounted The applicant has been selling pressure filters for many years. In rotary pressure filters of this type, a suspension, which is a mixture of liquids and solids, is applied to a rotating filter drum. The filter drum is designed in such a way that liquid of the suspension can pass through a wall of the filter drum, whereas solids of the suspension remain on a surface of the filter drum. As a result, a solid layer forms on the surface of the filter drum, which experts call 'filter cake'.

Depending on the type of rotary pressure filter, the filter cake can be removed, for example after complete rotation of the filter drum, to introduce new suspension to be filtered onto the filter drum, for example into cells formed on the filter drum.

To improve the efficiency of such a rotary pressure filter, it is desirable for a corresponding filtration zone of the filter drum to, if possible, be filled 100%, wherein, however, overfilling is to be avoided.

Known apparatuses attempt to determine the filter cake thickness by means of a mass or volumetric flow measurement in the suspension feed. However, this measurement method only gives a rough indication of the filter cake thickness. There are various disturbance variables that affect the filter cake thickness but are not covered by this indirect measurement method. For example, the filter cake thickness changes relatively to the density of the solid, which cannot be determined using the measurement method shown.

It is therefore an object of the present invention to provide a measurement method that can measure the filter cake thickness regardless of such disturbance variables.

This object is achieved by a generic rotary pressure filter characterised in that a sensor is attached to the housing, which sensor emits light through a light-permeable section of the housing in the direction of the filter cake and receives light reflected from the filter cake through the light-permeable section of the housing, wherein the rotary pressure filter further comprises a processing unit that is designed to compare properties of the emitted light with those of the received light and to determine an absolute thickness of the filter cake and/or a change in the thickness of the filter cake over a pre-determined time.

At this point it should be mentioned that the 'thickness of the filter cake' refers to an expansion of the filtrate layer on the filter drum in a radial direction with respect to the filter drum.

The sensor arrangement according to the invention enables direct measurement of the filter cake layer such that the actual thickness of this filter cake layer can be detected. The light emitted from the sensor for this purpose reaches the filter cake with a pre-determined property, such as, for example, a pre-determined transit time from the sensor to the filter cake or a pre-determined angle relative to the surface of the filter cake to which the light is incident, or a pre-determined colour or the like. This pre-determined property is changed due to the reflection of the light on the filter cake in such a way that the reflected light received by the sensor has at least one property that deviates from the properties of the emitted light. This deviation of the at least one property to be compared between emitted light and received light serves as a basis for the processing unit for calculating the thickness of the filter cake.

It can be advantageous for the rotary pressure filter to comprise a storage unit that is operatively connected to the processing unit and that stores values of the properties of the emitted and/or received light. The storage unit can thus include values that have already been stored at the start of the operation of the rotary pressure filter and can also store values during the operation of the rotary pressure filter. For example, a transit time of the light from the sensor to the surface of the filter drum, for example to the bottom of an empty filter cell, and back to the sensor can be stored in the storage unit. If the sensor detects a transit time of the light that is shorter than the stored transit time described above, the processing unit can use a difference between these two transit times by comparing the measured transit time with the stored transit time to calculate the thickness of the filter cake. For example, the transit time of the light can be 2.33 ns for an empty cell, 1.83 ns for a half-full cell and 1.33 ns for a completely filled cell. In an analogous manner, an angle can be stored in the storage unit, which angle is formed by a light beam emitted by the sensor with respect to a light beam incident in a receiving unit of the sensor. A deviation from a measured angle to this stored angle can accordingly be used to determine the thickness of the filter cake layer.

The sensor and the processing unit can be designed as an integral component.

The sensor can advantageously be arranged outside a process chamber of the rotary pressure filter. The sensor can thus be protected from the pressures and temperatures occurring in the process chamber. This means that a sensor can be used that has to meet significantly lower requirements, for example with regard to explosion safety and other approvals. In this way, not only can the costs for the sensor or the associated structure be reduced, but measurement methods can also be used that could not be available for a sensor arranged in the process chamber. In addition, this can increase the service life of the sensor and/or reduce contamination of the sensor.

In one embodiment of the present invention, the sensor can be arranged such that the emitted light strikes the surface of the filter cake substantially orthogonally. The light-permeable section of the housing can be formed, for example, by a sight glass arranged in the housing, wherein the light emitted by the sensor passes perpendicularly through the surface of the sight glass. In particular, such an arrangement of the sensor relative to the filter cake can enable a distance to be travelled between the sensor and the filter cake to be as small as possible. In the event that solids are included in the distance between the sensor and the filter cake, for example suspended matter in the space between the sensor and filter cake, an attenuation and/or distortion of the emitted light with respect to the received light can be reduced or even be avoided.

In an advantageous embodiment of the present invention, the sensor can be a laser triangulation sensor. Such sensors are based on the principle that the sensor emits a laser point or an arrangement of laser points, in particular a line comprising 600 laser points. The laser light is scattered on the surface of the filter cake, wherein light beams are able to strike a receiving unit of the sensor through an aperture in the sensor. Depending on the position of the light point or the light points on the receiving unit of the sensor, given a known distance between the light-emitting unit and the receiving unit or between the aperture and the receiving unit, a distance from the filter cake can be determined. Due to the fact that the surface of the filter cake often cannot be homogeneous, but rather can have depressions through which, for example, liquid flows out of the suspension, the use of a sensor that emits and receives a plurality of laser points can improve a detection accuracy of the actual thickness of the filter cake.

Alternatively, the sensor can also be a laser transit time measurement sensor. In this type of sensor, a transit time is measured between the time at which light is emitted by the sensor and the time at which this light reflected from the filter cake is received again. A thick filter cake results in a shorter transit time of the emitted light than a thin filter cake due to the closer surface of the filter cake relative to the sensor. On the one hand, a change in the transit time can be recorded by means of a series of transit time measurements, and a change in the filter cake thickness can thus be concluded. On the other hand, a transit time of the laser beam up to the bare filter drum, that is to say a filter drum without a filter cake formed thereon, can be known. Advantageously, transit times of the laser beam can also be known for pre-determined filter cake thicknesses, for example from 1 cm to 150 cm in 1 cm increments, such that a transit time of the laser beam can be compared directly with a known value to determine the thickness of the filter cake layer.

In particular when using a laser transit time measurement sensor, but not limited thereto, the sensor can emit pulsed light. In this case, 'pulsed light' is to be understood as light that is emitted at a pre-determined clock frequency, that is to say according to pre-determined switch-on and switch-off intervals. Based on a known pulse rate of the emitted light, a transit time or an angle or the like can be measured separately for each emitted light pulse.

Alternatively or additionally, the sensor can emit light continuously. In particular when using a laser triangulation method, but not limited thereto, continuous emission of light and thus continuous reception of light can lead to complete monitoring of the thickness of the filter cake. To compensate for a measurement of the above-mentioned depressions in the filter cake layer, the processing unit can, for example, be provided with an algorithm that can disregard measurement deviations that indicate a locally limited depression in the surface of the filter cake layer when determining the thickness of the filter cake layer. Furthermore, the processing unit can be provided with an algorithm, for example, that detects structural and known changes in the measured surface or disregards them when determining the thickness of the filter cake layer, such as the partition walls arranged between the individual filter cells of the filter drum.

The rotary pressure filter can further comprise a control unit that is designed to set a rotational speed of the filter drum on the basis of the filter cake thickness determined by the processing unit. Accordingly, if the maximum possible thickness of the filter cake is not fully utilised, the rotational speed of the filter drum can be reduced such that more suspension can be applied to a section, for example a filter cell, of the filter drum. Similarly, the control unit can increase the rotational speed of the filter drum if the specific thickness of the filter cake layer indicates the risk of the filter drum or the cells of the filter drum being overfilled.

In this case, the adaptation of the rotational speed of the filter drum can be carried out both automatically in the sense of a self-regulating control device and on the basis of operation by a user to whom, for example, the signal determined by the processing unit, which indicates the thickness of the filter cake, is output.

In a second aspect, the present invention relates to a method for determining a thickness of a filter cake that is formed when filtering material to be filtered on a surface of a filter drum of a rotary pressure filter, in particular a rotary pressure filter as described above, characterised in that a sensor emits light in the direction of the filter cake and receives light reflected from the filter cake, and in that a processing unit compares properties of the emitted light with properties of the received light so as to determine the thickness of the filter cake and/or a change in the thickness of the filter cake.

With regard to the advantages and possibilities of the method according to the invention, reference is explicitly made here to the features and the description relating to the device of the rotary pressure filter.

The processing unit can output a signal to a control unit that sets a rotational speed of the filter drum on the basis of the signal output by the processing unit.

In this regard, too, reference is made to the above description in relation to the rotary pressure filter.

The invention will be described in greater detail below with reference to the accompanying drawings.

In the drawings:

FIG. 1 is a schematic side cross-sectional view of a sensor arrangement on a section of a housing of the rotary pressure filter according to the invention.

A section of a rotary pressure filter 10 is shown in FIG. 1. In the section of the rotary pressure filter 10, a sensor 12 can be seen that emits a laser beam 14. The laser beam 14 extends from the sensor 12 through a sight glass 16 that arranged in a connecting piece 18. The connecting piece 18 is arranged at an opening 20 of a housing 22 of the rotary pressure filter 10 in such a way that it forms an airtight seal with the housing 22 and accommodates the sight glass 16 in an airtight manner with respect to an outer side of the housing 22. The sight glass 16 thus divides the laser beam 14 into a section 24 arranged outside a process chamber of the rotary pressure filter and a section 26 arranged inside the process chamber. Accordingly, it can be clearly seen in FIG. 1 that the sensor 12 is arranged outside the process chamber of the rotary pressure filter.

The laser beam 14 then strikes a surface of a filter cake 28 from which it is reflected. The filter cake 28 is formed when suspension is filtered on the surface of a filter drum 30. A portion of the reflected laser beam 14a (shown with the emitted laser beam 14 superimposed in FIG. 1) then re-enters through the sight glass 16 and into a receiving unit of the sensor 12.

According to a difference between properties of the light 14 emitted by the sensor 12 and properties of the light 14a reflected by the surface of the filter cake 28, such as a total transit time from emission to reception of the light or an angle between the emitted laser beam 14 and the laser beam 14a entering the receiving unit of the sensor 12, which has been reflected by the filter cake 28, a distance of the surface of the filter cake 28 relative to the sensor 12 and thus a thickness of the filter cake 28 can be determined.

In the embodiment shown in FIG. 1, the sensor 12 is based on a transit time measurement method. A pulse of a laser beam can be emitted by the sensor, which pulse is reflected by the surface of the filter cake 28 and then re-enters the receiving unit of the sensor 12. Either a change in the transit time can be recorded by means of a series of transit time measurements, and a change in the filter cake thickness can thus be concluded, or a transit time of the laser beam up to the bare filter drum, that is to say a filter drum without a filter cake formed thereon, can be known. Advantageously, transit times of the laser beam can also be known for pre-determined filter cake thicknesses, for example from 1 cm to 150 cm in 1 cm increments, such that a transit time of the laser beam can be compared directly with a known value to determine the thickness of the filter cake layer.

The invention claimed is:

1. A rotary pressure filter, comprising:
    a filter drum for filtering material, wherein a filter cake is formed on a surface of the filter drum when the material is filtered;
    a process chamber that surrounds the filter drum, wherein the filter drum is rotatably mounted in the process chamber, and wherein the filter cake is formed in the process chamber;
    a housing that surrounds the process chamber, wherein the process chamber is configured to exhibit an internal pressure which is higher than a pressure in an external environment of the housing, and wherein the housing includes a light-permeable section;
    a connecting piece arranged at an opening of the housing in such a way that it forms an airtight seal between the process chamber and the external environment of the housing;
    a sensor arranged in the external environment of the housing and attached to the housing by way of the connecting piece, wherein the connecting piece accommodates the light-permeable section of the housing, wherein the sensor emits light from the external environment of the housing through the light-permeable section of the housing into the process chamber in a direction of the filter cake and receives light from within the process chamber that is reflected from the filter cake through the light-permeable section of the housing and wherein the sensor is arranged such that the emitted light travels from the sensor to the surface of the filter cake substantially orthogonally; and
    a processor configured to receive information from the sensor representing properties of the emitted light and properties of the received light, wherein the processor is further configured to (1) compare the properties of the emitted light with the properties of the received light and, (2) based on the comparison, determine a thickness of the filter cake.

2. The rotary pressure filter according to claim 1, wherein the rotary pressure filter further comprises a storage device operatively connected to the processor, wherein the storage device stores values of at least one of the properties of the emitted light or the properties of the received light.

3. The rotary pressure filter according to claim 1, wherein the sensor is a laser triangulation sensor.

4. The rotary pressure filter according to claim 1, wherein the sensor is a laser transit time measurement sensor.

5. The rotary pressure filter according to claim 1, wherein the sensor emits pulsed light.

6. The rotary pressure filter according to claim 1, wherein the sensor continuously emits light.

7. The rotary pressure filter according to claim 1, wherein the rotary pressure filter further comprises a control that is designed to set a rotational speed of the filter drum on the basis of the filter cake thickness determined by the processor.

8. The rotary pressure filter according to claim 1, wherein the thickness of the filter cake represents at least one of an absolute thickness of the filter cake or a change in the thickness of the filter cake over a predetermined time.

9. The rotary pressure filter according to claim 1, wherein the thickness of the filter cake is determined based on a deviation in angles between the light emitted from the sensor and the received light reflected from the filter cake.

10. A method for determining a thickness of a filter cake that is formed when filtering material on a surface of a filter drum of a rotary pressure filter, the method comprising:
    emitting into a process chamber of the rotary pressure filter, by a sensor arranged in an external environment of a housing which surrounds the process chamber of the rotary pressure filter, light in a substantially orthogonal direction from the sensor to the surface of the filter cake, wherein the process chamber surrounds the filter drum, and wherein in the process chamber a filtration process takes place to form the filter cake and the process chamber exhibits an internal pressure which is higher than a pressure in the external environment of the housing;
    wherein the housing includes a light permeable section and is attached to the sensor by way of a connecting piece arranged at an opening of the housing, wherein the connecting piece forms an airtight seal between the process chamber and the external environment of the housing and accommodates the light-permeable section of the housing;
    receiving from within the process chamber, by the sensor, light reflected from the filter cake;
    providing, by the sensor, information representing properties of the emitted light and properties of the received light; and
    comparing, by a processor, the properties of the emitted light with the properties of the received light to determine a thickness of the filter cake.

11. The method according to claim 10, further comprising:
    outputting, by the processor, a signal to a control, wherein the signal indicates the filter cake thickness; and
    setting, by the control, a rotational speed of the filter drum based on the signal output by the processor.

12. The method according to claim 10, wherein the filter drum is rotatably mounted in the housing and the sensor is attached to the housing.

13. The method according to claim 12, wherein the sensor emits the light through the light-permeable section of the housing in the direction of the filter cake and receives light reflected from the filter cake through the light-permeable section of the housing.

14. The method according to claim 10, further comprising storing, by a storage device operatively connected to the processor, values of at least one of the properties of the emitted light or the properties of the received light.

15. The method according to claim 10, wherein the sensor comprises a laser triangulation sensor or a laser transit time measurement sensor.

16. The method according to claim 10, wherein the sensor emits pulsed light.

17. The method according to claim 10, wherein the sensor continuously emits light.

18. The method according to claim 10, wherein the thickness of the filter cake represents at least one of an absolute thickness of the filter cake or a change in the thickness of the filter cake over a predetermined time.

19. The method according to claim 10, wherein the thickness of the filter cake is determined based on a deviation in angles between the light emitted from the sensor and the received light reflected from the filter cake.

* * * * *